United States Patent
Mubarek et al.

(10) Patent No.: US 11,348,452 B2
(45) Date of Patent: May 31, 2022

(54) METHOD, APPARATUS, AND SYSTEM FOR AUTOMATIC CLOSURE VERIFICATION USING MULTIPLE POSSIBLE VEHICLE PATHS

(71) Applicant: HERE GLOBAL B.V., Eindhoven (NL)

(72) Inventors: Omer Mubarek, Chicago, IL (US); Colin Watts-Fitzgerald, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 127 days.

(21) Appl. No.: 16/778,835

(22) Filed: Jan. 31, 2020

(65) Prior Publication Data

US 2021/0241614 A1 Aug. 5, 2021

(51) Int. Cl.
G08G 1/16 (2006.01)
G08G 1/01 (2006.01)
G08G 1/0967 (2006.01)

(52) U.S. Cl.
CPC ......... *G08G 1/0133* (2013.01); *G08G 1/0112* (2013.01); *G08G 1/0116* (2013.01); *G08G 1/096716* (2013.01)

(58) Field of Classification Search
CPC .. G08G 1/0133; G08G 1/0112; G08G 1/0116; G08G 1/096716; G08G 1/00; G08G 1/0104; G08G 1/012; G08G 1/0129; G08G 1/0141; G08G 1/0968; G08G 1/16; G01C 21/3691; G01C 21/3617; G01C 21/00; G01C 21/26; G01C 19/00; G01C 21/34;

(Continued)

(56) References Cited

U.S. PATENT DOCUMENTS

2012/0209507 A1* 8/2012 Serbanescu ............ G01C 21/04
701/410
2015/0300835 A1 10/2015 Fowe et al.
(Continued)

FOREIGN PATENT DOCUMENTS

WO 2014147200 A1 9/2014

OTHER PUBLICATIONS

Office Action for related European Patent Application No. 21154067.9-1203, dated Jul. 1, 2021, 11 pages.

*Primary Examiner* — Hai Phan
*Assistant Examiner* — Anthony D Afrifa-Kyei
(74) *Attorney, Agent, or Firm* — Ditthavong, Steiner & Mlotkowski

(57) ABSTRACT

An approach is provided for automatically verifying a road closure using multiple possible vehicle paths between two probe points. The approach involves, for example, processing probe data to determine a possible path of a vehicle over a road graph, wherein the road graph represents a road link and one or more other road links entering or exiting the road link. The approach also involves calculating a path probability for the possible path, wherein the path probability indicates a likelihood that the possible path is a true path of the vehicle over the road graph. The approach further involves assigning a weighted vehicle count to the road link and/or one or more other road links contained in the possible path, wherein the weighted vehicle count is based on the path probability. The approach further involves detecting a traffic anomaly occurring on the road link based on the weighted vehicle count.

18 Claims, 14 Drawing Sheets

(58) Field of Classification Search
CPC ............... G01C 21/36; G01C 21/3484; G01C 21/3837; G01C 21/32; G01C 21/28; G01C 21/30; B60R 16/023; B60T 7/12; B60W 50/0097; B60W 2552/20; B60W 2554/00; B60W 2556/50; B60W 30/10; B60W 30/18145; B60W 30/18154; G05D 1/0212
See application file for complete search history.

(56) References Cited

U.S. PATENT DOCUMENTS

| | | | |
|---|---|---|---|
| 2016/0379485 A1* | 12/2016 | Anastassov | G08G 1/0141 |
| | | | 701/117 |
| 2019/0139404 A1* | 5/2019 | Geisler | G08G 1/166 |
| 2020/0111348 A1* | 4/2020 | Gentile | G08G 1/0145 |
| 2020/0111357 A1* | 4/2020 | Mubarek | G08G 1/0141 |
| 2021/0095975 A1* | 4/2021 | Mubarek | G08G 1/0129 |

* cited by examiner

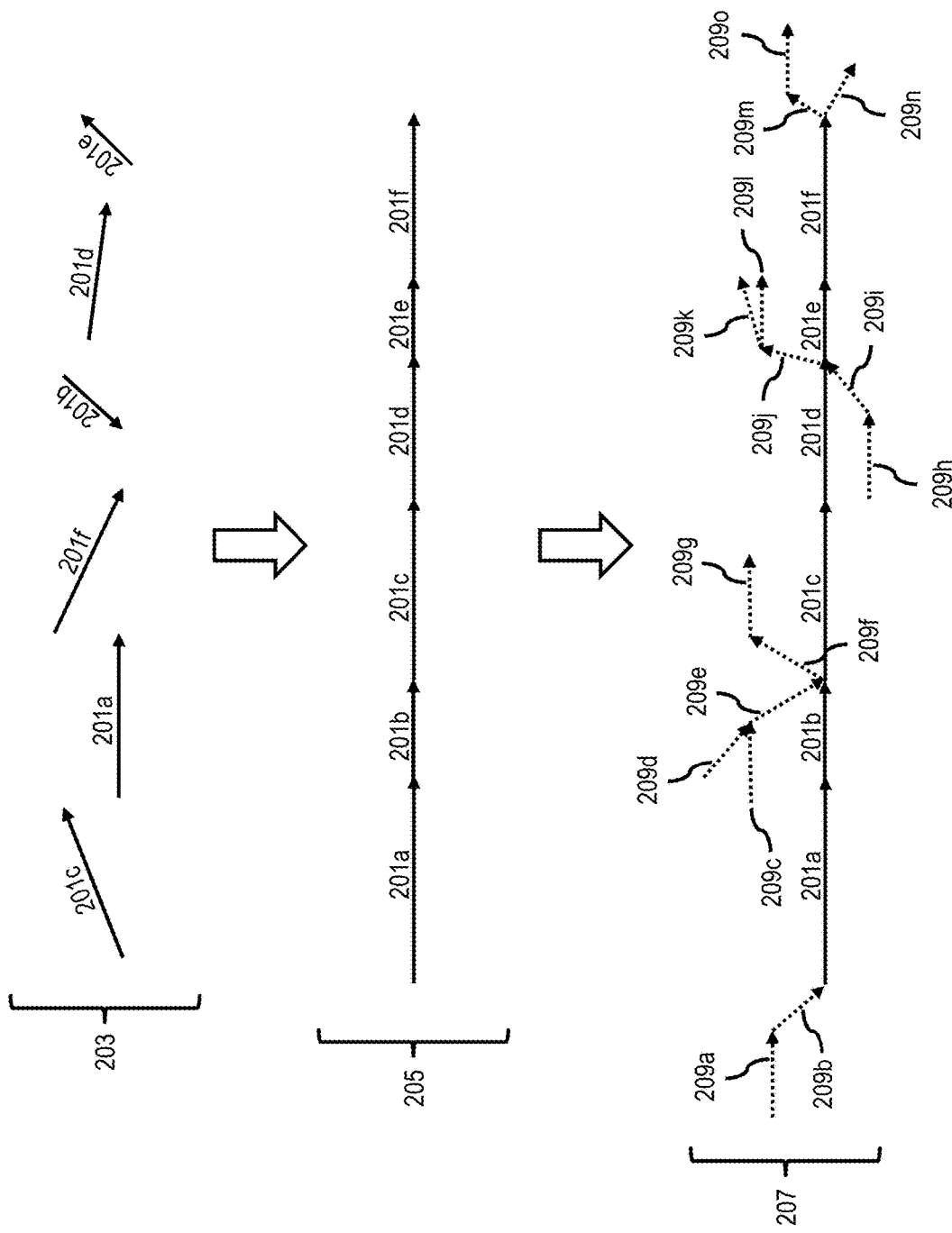

METHOD, APPARATUS, AND SYSTEM FOR AUTOMATIC CLOSURE VERIFICATION USING MULTIPLE POSSIBLE VEHICLE PATHS

BACKGROUND

Providing data on traffic anomalies or incidents (e.g., abnormalities in traffic that can affect traffic flow such as accidents, lane closures, road closures, etc.) is an important function for mapping service providers. While most traffic anomalies can have at least some negative impact on traffic, road closures can be the most severe because vehicles are unable to travel through the affected roadway. In addition, the lack of knowledge, particularly real-time knowledge, about a road closure can have an enormous negative impact on a user's trip planning, routing, and/or estimated time of arrival. Moreover, obtaining accurate, real-time traffic information regarding road closures is particularly challenging. For instance, once a road closure is reported (e.g., by a third-party provider), service providers regularly use global positioning system (GPS) probe data to generate vehicle paths to verify and monitor traffic conditions in the affected area. However, due to location sensor accuracy limitations and/or map matching errors, for example, multiple possible vehicle paths are often generated between two probe points making verifying the inferred traffic conditions difficult. Current strategies attempt to resolve this problem by selecting the vehicle path with the highest probability of being the true path to evaluate a road segment for closure. However, crucial information regarding discarded possible paths may then be ignored, thereby significantly reducing the accuracy of the evaluation. Accordingly, mapping service providers face significant technical challenges to automatically verify traffic conditions (e.g., road closures) using multiple possible vehicle paths.

SOME EXAMPLE EMBODIMENTS

Therefore, there is a need for an approach for automatically verifying a road closure using multiple possible vehicle paths.

According to one embodiment, a method comprises processing probe data to determine at least one possible path of a vehicle over a road graph, wherein the road graph represents a road link and one or more other road links entering or exiting the road link. The method also comprises calculating a path probability for the at least one possible path, wherein the path probability indicates a likelihood that the at least one possible path is a true path of the vehicle over the road graph. The method further comprises assigning a weighted vehicle count to the road link, the one or more other road links, or a combination thereof contained in the at least one possible paths, wherein the weighted vehicle count is based on the path probability. The method further comprises detecting a traffic anomaly occurring on the road link based on the weighted vehicle count.

According to another embodiment, an apparatus comprises at least one processor, and at least one memory including computer program code for one or more computer programs, the at least one memory and the computer program code configured to, with the at least one processor, cause, at least in part, the apparatus to process probe data to determine at least one possible path of a vehicle over a road graph, wherein the road graph represents a road link and one or more other road links entering or exiting the road link. The apparatus is also caused to calculate a path probability for the at least one possible path, wherein the path probability indicates a likelihood that the at least one possible path is a true path of the vehicle over the road graph. The apparatus is further caused to assign a weighted vehicle count to the road link, the one or more other road links, or a combination thereof contained in the at least one possible path, wherein the weighted vehicle count is based on the path probability. The apparatus is further caused to detect a traffic anomaly occurring on the road link based on the weighted vehicle count.

According to another embodiment, a non-transitory computer-readable storage medium carries one or more sequences of one or more instructions which, when executed by one or more processors, cause, at least in part, an apparatus to process probe data to determine at least one possible path of a vehicle over a road graph, wherein the road graph represents a road link and one or more other road links entering or exiting the road link. The apparatus is also caused to calculating a path probability for the at least one possible path, wherein the path probability indicates a likelihood that the at least one possible path is a true path of the vehicle over the road graph. The apparatus is further caused to assign a weighted vehicle count to the road link, the one or more other road links, or a combination thereof contained in the at least one possible path, wherein the weighted vehicle count is based on the path probability. The apparatus is further caused to verify a road closure on the road link based on the weighted vehicle count.

According to another embodiment, an apparatus comprises means for processing probe data to determine at least one possible path of a vehicle over a road graph, wherein the road graph represents a road link and one or more other road links entering or exiting the road link. The apparatus also comprises means for calculating a path probability for the at least one possible path, wherein the path probability indicates a likelihood that the at least one possible path is a true path of the vehicle over the road graph. The apparatus further comprises means for assigning a weighted vehicle count to the road link, the one or more other road links, or a combination thereof contained in the at least one possible path, wherein the weighted vehicle count is based on the path probability. The apparatus also comprises means for detecting a traffic anomaly occurring on the road link based on the weighted vehicle count.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 2A and 2B are diagrams illustrating an example of constructing a roadway graph, according to one embodiment;

DESCRIPTION OF SOME EMBODIMENTS

Examples of a method, apparatus, and computer program for automatically verifying a road closure using multiple possible vehicle paths are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
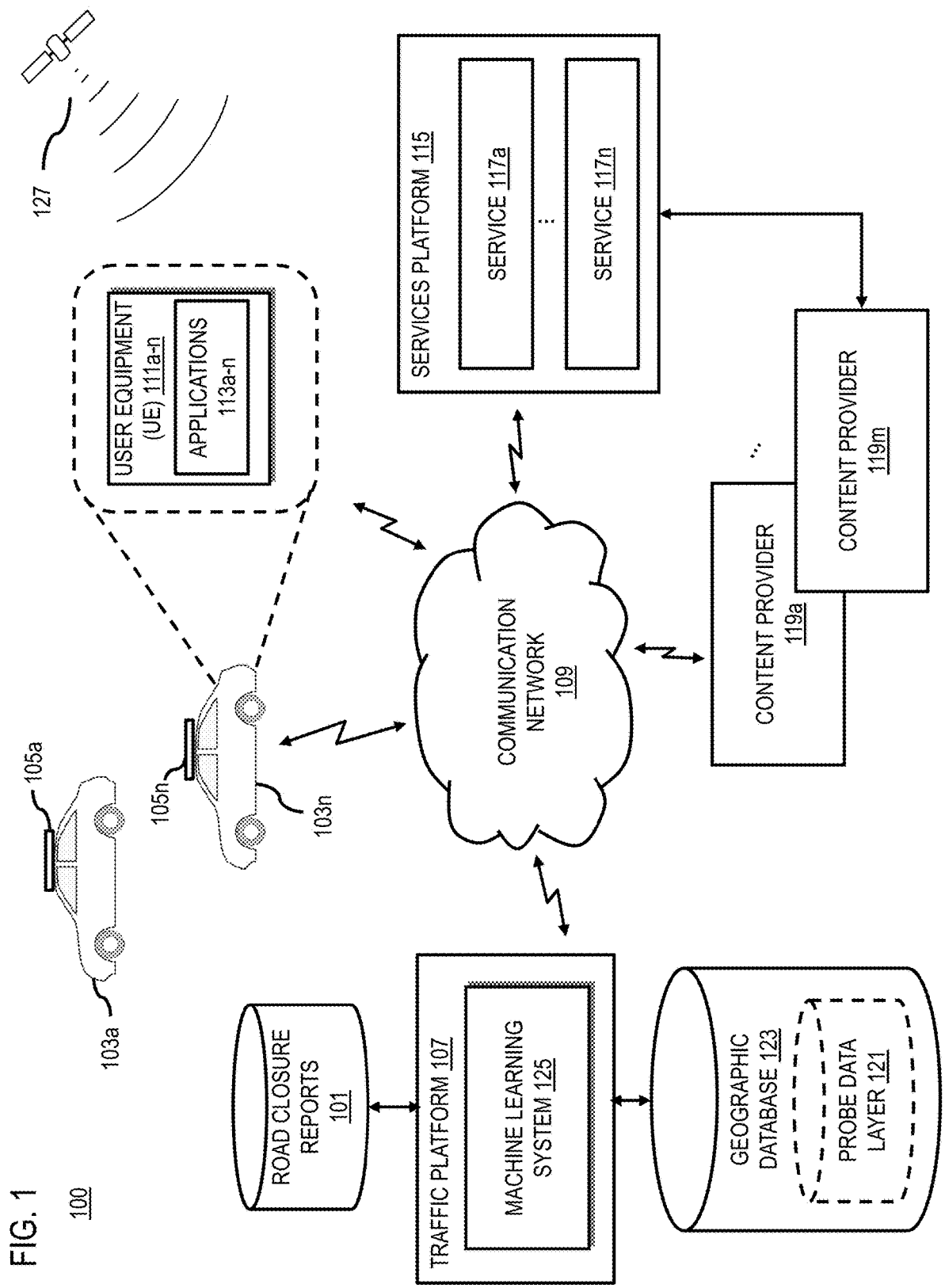
FIG. 1 is a diagram of a system capable of automatically verifying a road closure using multiple possible vehicle paths, according to one embodiment.

FIG. 1 is a diagram of a system capable of automatically verifying a road closure (e.g., a reported/detected closure) using multiple possible vehicle paths, according to one embodiment. As mentioned above, providing data on traffic anomalies or incidents (e.g., abnormalities in traffic that can affect traffic flow such as accidents, lane closures, road closures, etc.) is an important function for mapping service providers. While most traffic anomalies can have at least some negative impact on traffic, road closures can be the most severe because vehicles are unable to travel through the affected roadway. In addition, the lack of knowledge, particularly real-time knowledge, about a road closure can have an enormous negative impact on a user's trip planning, routing, and/or estimated time of arrival. Moreover, obtaining accurate, real-time traffic information regarding road closures is particularly challenging. For example, when a road closure is reported (e.g., by a third-party provider such as a local municipality), service providers often start monitoring the reported area and collecting GPS probes. For each vehicle, the service providers generate vehicle paths. Vehicle pathing refers to taking data points from vehicles on a road and interpolating the path between consecutive points of an individual vehicle. Traffic conditions along that path can then be inferred/interpolated using the distance and travel time between points.

A common way for traffic systems to build vehicle paths is to: (1) isolate probes for a specific vehicle V; (2) map-match these probes onto road segments defined on a map; and (3) apply an algorithm to connect two consecutive map-matched probe points of vehicle V. However, this third step can produce multiple possibilities between two probe points (e.g., due location sensor accuracy limitations, map matching errors, etc.) resulting in multiple possible paths. In such instances, systems often assign each of these paths a weight; either a probability or another weight indicating a likelihood of being the true path. The systems then choose one of these paths as the correct path to the exclusion of all other possible paths.

Even if the respective probabilities of the various possible paths are very close to each other, existing systems still pick only one path as the correct path. For instance, if a system identifies 3 possible paths with the probabilities p1=0.337; p2=0.333; and p3=0.330, the system will pick path 1 with p1=0.337 and discard paths 2 and 3 from further consideration. This creates the risk of throwing out important information. For example, there is a good chance that path 2 or path 3 could be the correct path; yet the system treats the paths as through the probabilities were p1=0.999; p2=0.00005; p3=0.00005. The systems then aggregate these paths over many vehicles to decide whether a road link is closed or not. In this example, the systems will treat paths 2 and 3 as though they are closed when it is likely that they are open. Consequently, potential correct paths may be prematurely eliminated, thereby significantly reducing a system's decision-making quality. Further, trying to update and/or verify this information in real time may require considerable human interaction (e.g., human observation). Accordingly, mapping service providers face significant technical challenges to automatically verify traffic conditions (e.g., road closures) using multiple possible vehicle paths.

To address these problems, the system 100 of FIG. 1 introduces a capability to automatically verify a reported/detected road closure using GPS probe data. In one embodiment, the system 100 verifies the road closure by:

Isolating reported road segments by building a connected road graph around them;
Monitoring the GPS probes received on the road segments within this connected road graph;
Building vehicle paths for each vehicle from observed probes;
Identifying driving patterns from these vehicle patterns; and
Evaluating the road segment for closure—the output of the evaluation for each road segment being whether the road is closed or not.

In one embodiment, the system 100 uses all possible paths whose likelihood/probability matches certain criteria (e.g., a minimum acceptable probability) to verify whether a road is likely closed or not.

In one embodiment, the system 100 first isolates the reported road segments by building a connected road graph (e.g., a closure link graph) around them. For example, the system 100 may generate a roadway or closure link graph (i.e., used synonymously herein) to seal or designate the reported closure area and monitor traffic around and through the closure within the area represented by the closure link graph. Generally, traffic incidents such as road closures are published by government/municipality agencies, local police, and/or third-party official/semi-official sources (e.g., via road closure reports 101). By way of example, the published road closure reports 101 can specify the roadway (e.g., by name or matched to specific road link records of digital map data such as a geographic database) that has been closed or partially closed to traffic (e.g., vehicular and/or non-vehicular traffic). In one instance, closure refers to restricting traffic flow on a roadway such that no vehicle or a reduced number of vehicles (e.g., reduced with respect to an average free flow traffic volume on the roadway) is permitted or able to travel on the roadway.

In one embodiment, the system 100 then converts a closure report 101 into a set of links. As shown in FIG. 2A, these links (e.g., links 201a-201f, also collectively referred to as links 201) can be an unordered set 203 (e.g., unordered with respect to a spatial arrangement). If the links 201 are unordered, then the system 100 initiates the building of the closure link graph around these links 201 by ordering the links 201 so that the end of one link is arranged to match the beginning of the next closest link based on the respective locations of their beginning and end nodes. The ordered set 205 of the links 201 is also illustrated in FIG. 2A. The ordered set 205 of the links 201 corresponds to the abstract representation of the physical structure road segments making up the roadway indicated in the road closure report 101.

In one instance, the system 100 adds links upstream to and downstream from the reported closures (e.g., links 209a-209o, also collectively referred to as links 209) to construct the closure link graph 207. Since these links 209 are not among the original links 201 identified in the road closure report 105, the links 209 are assumed to be open and not closed to traffic. The resulting roadway or closure link graph 207 then includes the reportedly closed links 201 buffered by links 209 that are open for travel. In other words, with the addition of open upstream and downstream links 209, the closure (e.g., on links 201) is now isolated. For example, given the closure links 201, all traffic going into and out of the closure region can be monitored using the traffic flowing in the open links 209.

In one embodiment, the system 100 determines the flow of traffic by processing probe data from one or more vehicles 103a-103n (also collectively referred to as vehicles 103) (e.g., standard vehicles, autonomous vehicles, heavily assisted driving (HAD) vehicles, semi-autonomous vehicles, etc.). In one instance, the vehicles 103 include one or more vehicle sensors 105a-105n (also collectively referred to as vehicle sensors 105) (e.g., GPS sensors) and have connectivity to the traffic platform 107 via the communication network 109. In one embodiment, the probe data may be reported as probe points, which are individual data records collected at a point in time that records telemetry data for that point in time. A probe point can include attributes such as: (1) probe ID, (2) longitude, (3) latitude, (4) heading, (5) speed, and (6) time.

In one embodiment, the system 100 can also collect probe data from one or more user equipment (UE) 111a-111n (also collectively referenced to herein as UEs 111) associated with the a vehicle 103 (e.g., an embedded navigation system), a user or a passenger of a vehicle 103 (e.g., a mobile device, a smartphone, a client terminal, etc.), or a combination thereof. In one instance, the UEs 111 may include one or more applications 113a-113n (also collectively referred to herein as applications 113) (e.g., a navigation or mapping application). In one embodiment, the system 100 may also collect the probe data from one or more other sources such as government/municipality agencies, local or community agencies (e.g., police departments), and/or third-party official/semi-official sources (e.g., the services platform 115, one or more services 117a-117n, one or more content providers 119a-119m, etc.). In one instance, the probe data collected by the vehicle sensors 105, the UEs 111, one or more other sources, or a combination thereof may be stored in the probe data layer 121 of the geographic database 123 or a combination thereof.

For example, the system 100 retrieves probe data collected from vehicles 103 traveling on the roadways corresponding to the closure link graph 207. In one embodiment, probe data includes raw GPS probes (e.g., probe points) sent from vehicles 103 indicating their respective locations by, for example, a latitude and longitude pair. In one instance, the system 100 places each probe point onto a most probable link on a digital map using a map matching process. One example of the map-matching process works as described in the following section. A digital map is defined by a set of links and their geographic coordinates. Because GPS (or other similar location positioning technology) is not 100% accurate, the coordinates of a vehicle sensor 105 (e.g., a GPS probe) often do not fall perfectly onto a link. To account for this error, the system 100 (e.g., using one or more map matching algorithms) takes the coordinates of a GPS probe, and finds the neighboring links whose coordinates are close to the probe. The system 100 then places the vehicle probe 105 onto the most probable link based on pre-defined criteria of the specific map matching process or algorithm being used.

In one embodiment, to better control for map matching error, the system 100 uses vehicle paths instead of map-matched vehicle probes. The reason is that map-matched vehicle probes are more susceptible to map matching errors than vehicle paths. For example, a vehicle path or trajectory is generally derived from two consecutive map-matched vehicle probes and new paths are built on top of the previously calculated vehicle path. Hence, a vehicle path generated in this manner will be more prone to map matching errors.

In one embodiment, the system 100 processes the probe data to calculate a vehicle path according to the example process described below. First, for a specific vehicle (e.g., a vehicle 103), the system 100 takes the first and second probe points received, e.g., denoted as probe1 and probe2. If the time difference between these probes is more than a specified threshold, the system 100 discards the initial probe1, sets probe1=probe2, and starts the process over. In one instance, the system 100 then retrieves the next probe point and denotes it as probe 2 to iteratively evaluate the time difference.

In one instance, if the time difference is less than the specified threshold, the system 100 builds a vehicle path from probe1 to probe2. It is contemplated that the system 100 can use any path building process or algorithm such as but not limited to A* pathfinding or equivalent. For example, if the system 100 can keep a sequence of probes in memory (e.g., in the probe data layer 121, the geographic database 123, or a combination thereof), the system 100 can use Hidden Markov Models (HMM) to select the most probable path over this sequence of probes. Whichever method is used, the system 100 picks the most probable path over all possible/considered candidates. The system 100 then records the new path for the vehicle 103, discards probe1, sets probe1=probe2, and retrieves the next probe point to act as probe2 until all probe points collected for the specific vehicle 103 have been processed.

In one embodiment, every vehicle 103 can send its probe points (e.g., GPS probes) at a different frequency; this frequency can vary from 1 second to a few minutes. Therefore, as a vehicle 103 drives through multiple links, there is no guarantee that it will send a probe from every link. For instance, if a vehicle 103 drives at fast speeds over short links while sending a probe every 2 minutes, it would almost be certain that its two consecutive probes will arrive from non-neighboring links. This sporadic or sparse probe reporting can make it more technically challenging for traffic systems to build accurate vehicle paths.

To address this technical challenge and to make it easier to generate vehicle paths, in one embodiment, as part of its link graph building process, the system 100 aggregates links and their probes into superlinks. In one embodiment, a superlink consists of ordered links such that if a vehicle 103 travels through one of its links, it is guaranteed to travel through the other links of the same superlink as well. An example of a superlink is a section of a highway stretching between two entrance/exit ramps. When on this stretch, a vehicle 103 must go through all the links. Another example is a roadway between two intersections in a city road. Because a superlink comprises one or more links, superlinks are often longer than normal links of the geographic database 123, thereby increasing the probability that a probe point of a vehicle path would fall on the superlink relative to a normal link. In addition, the superlinks can decrease the overall complexity of the closure link graph 207 without affecting the quality of the closure evaluation results, thereby reducing computing resources (e.g., processing resources, memory resources, bandwidth resources, etc.) associated with an automatic verification of a road closure according to the various embodiments described herein.

Figure 2B:
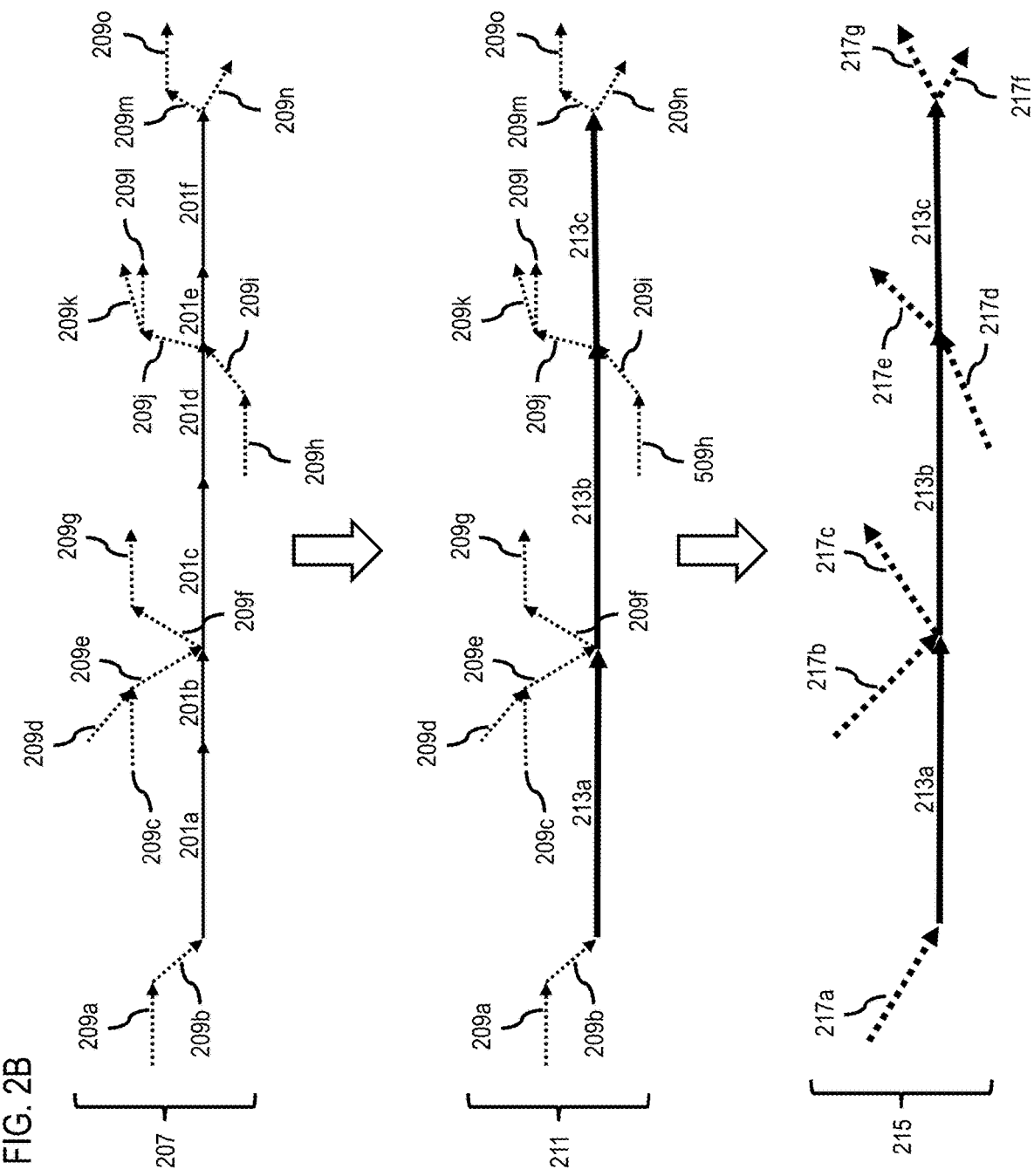

FIG. 2B is diagram of an example of aggregating road links of the closure link graph 207 into superlinks, according to one embodiment. FIG. 2B continues the example closure link graph 207 of FIG. 2A and illustrates a first superlink graph 211 that is a version of the closure link graph 207 in which the reportedly closed links 201 are aggregated into respective superlinks. In this example, links 201*a* and 201*b* can form a superlink 213*a* because a vehicle 103 on link 201*a* must also travel through link 201*b*. Similarly, links 201*c* and 201*d* can be aggregated as superlink 213*b*, and links 201*e* and 201*f* can be aggregated into superlink 213*c*.

In one embodiment, the upstream and downstream links 209 can be aggregated into superlinks in addition to the links 201 to construct superlink graph 215. For example, links 209*a* and 209*b* can be aggregated into superlink 217*a*, links 209*c*-209*e* can be aggregated into superlink 217*b*, links 209*f* and 209*g* can be aggregated into superlink 217*c*, links 209*h* and 209*i* can be aggregated into superlink 217*d*, links 209*j*-209*l* can be aggregated into superlink 217*e*, and links 209*m* and 209*o* can be aggregated into superlink 217*g*. Referring for instance to the example of FIGS. 2A and 2B, if a vehicle 103 has probe points on link 201*a*, 201*c*, and 201*f*, the system 100 can calculate the vehicle path to include all links 201*a*-201*f* based on the superlinks 213*a*-213*c*. In one embodiment, links and superlinks can be used interchangeably in the various embodiments described herein. Therefore, where links are described without reference to superlinks, it is contemplated that superlinks can be used in addition to or as alternate to links, and vice versa.

Figure 3A:
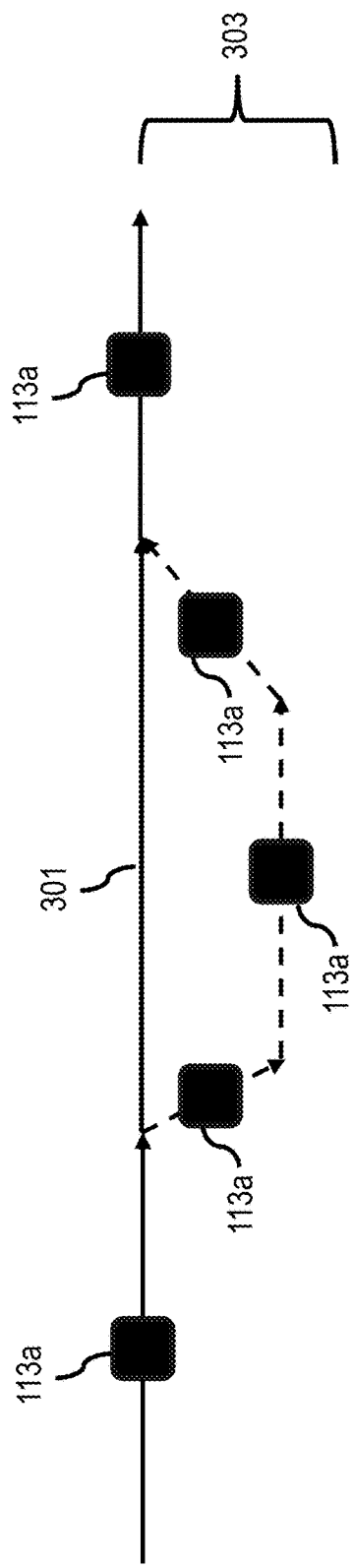
FIGS. 3A and 3B are diagrams illustrating an example of generating vehicle path related features, according to one embodiment.

In one embodiment, the system 100 generates a set of features related to the vehicle paths for training the machine learning system 125 to identify driving patterns (e.g., the probability of a vehicle volume on a road segment). For example, multiple vehicle paths over a given road graph construct driving patterns which can reveal anomalies within the monitored road graph to the system 100. One such example is a driving pattern where a high number of vehicles 103 detour a road segment (e.g., road segment 301); this pattern coupled with a lower-than-expected actual vehicle volume on segment 301 is a strong indicator of an incident on the road segment 301, as illustrated in FIG. 3A. In this example, the system 100 assumes that the actual volume on the segment 301 is 0 or close to 0, while the expected volume is much higher than that and that the detour segment 303 has a much higher actual volume than the expected volume. Consequently, the system 100 can infer a high probability of a road closure on segment 301.

Figure 3B:
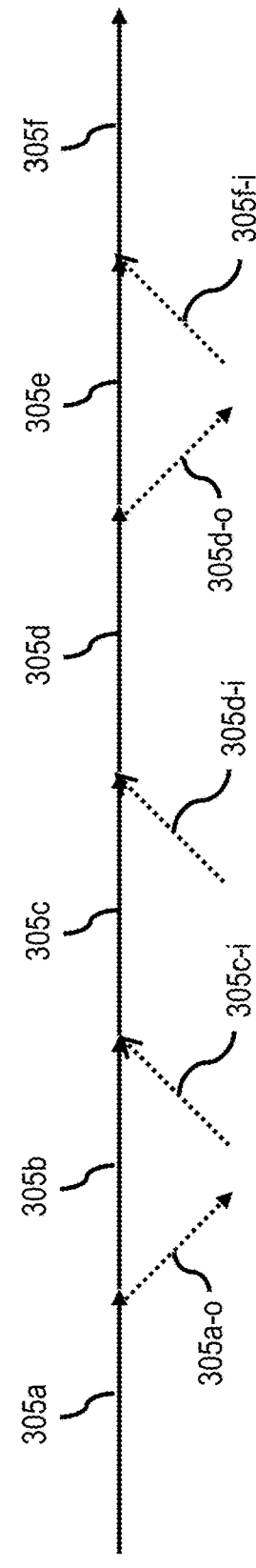

In another example, the system 100 can construct a more elaborate set of features over a larger part of the road network, as depicted in FIG. 3B. In this case, the system 100 generates features over neighboring superlinks 305 (e.g., superlinks 305*a* and 305*b*) as well as further apart superlinks (e.g., 305*a* and 305*d*). In this example, some potential features used by the system 100 to evaluate superlink 305*d* could be:

Number of vehicles passing through 305*d*
Number of vehicles passing through Last-Exit-Before-305*d*: 305*a*-out (o)

Number of vehicles passing through First-Exit-After-305$d$: 305$d$-o

Number of vehicles passing through First-Entry-Before-305$d$: 305$d$-in (i)

Number of vehicles passing through First-Entry-After-305$d$: 305$f$-i

Number of vehicles passing through previous superlink: 305$c$

Number of vehicles passing through next superlink: 305$e$

In one embodiment, the system 100 (e.g., using the machine learning system 125) can then compare these features, which take a snapshot of the real-time traffic conditions, against expected values for these features.

As explained in the probe processing section above, in one embodiment, the system 100 does not determine the volumes in these features (e.g., vehicle counts) directly from raw probe points, but rather from the vehicle paths generated from those probe points. In other words, the system 100 does not have to detect a physical probe point map-matched to a segment when calculating its vehicle volume. If the system 100 calculates a path passing through this road segment, even though there is no probe on the road segment, the system 100 will add the vehicle 103 to the volume on this road segment. Furthermore, if the system 100 map-matched a probe onto a road segment but the pathing algorithm (e.g., traffic platform 107) does not include that probe on a path going through the road segment (assuming it is a map-matching error), then the vehicle 103 is not counted in the volume for that road segment.

In one embodiment, the system 100 enhances vehicle path features using multiple possible vehicle paths (i.e., a soft path selection approach) rather than a hard path selection approach as used by many current traffic systems. As described above, traffic systems construct vehicle volume related features using vehicle paths. The systems then calculate these paths using a sequence of probe data for a given vehicle (e.g., a vehicle 103). However, this process generates multiple possible paths with different weights (or probabilities) which indicate the likelihood of each path being the true path. This approach has no ambiguity if, for example, one of the possible paths is dominating all the others heavily. For instance, if the probability of three possible paths is as follows: p1=0.9999, p2=0.00005, p3=0.00005. Then it is safe for a traffic system to pick p1 and discard p2 and p3. However, if the traffic system determines that the probabilities are p1=0.337, p2=0.333, and p3=0.330, then the system could be throwing out crucial information (and maybe the correct path) if it chooses p1 (since it has the highest probability) and discards paths 2 and 3. Specifically, in that scenario, road segments on paths 2 and 3 will not get any vehicle volume contribution; hence some of the features described in the above section will not increase or increment their volumes. Simply put, picking path 1 and discarding paths 2 and 3 could strongly influence a traffic system to prefer a path through 305$d$ over paths detouring and, therefore, avoiding 305$d$ (FIG. 3B). Such a decision (especially coupled with other similar path choices) could steer the final evaluation by a traffic system from 305$d$ is closed to 305$d$ is open.

Figure 4A:
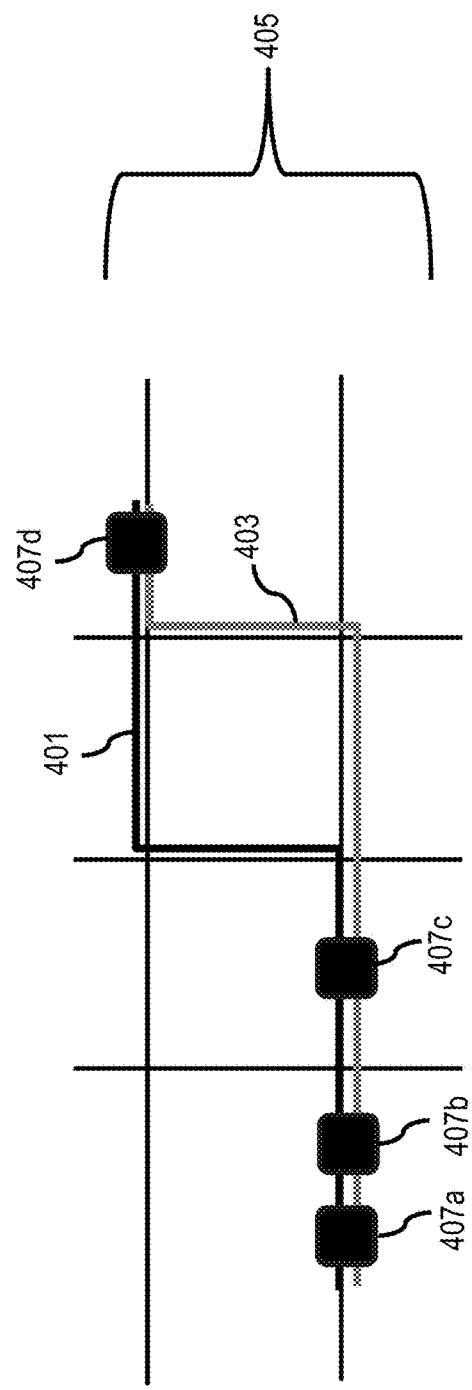
FIGS. 4A-4C are diagrams illustrating a soft vehicle path selection approach, according to one embodiment.
Figure 4B:
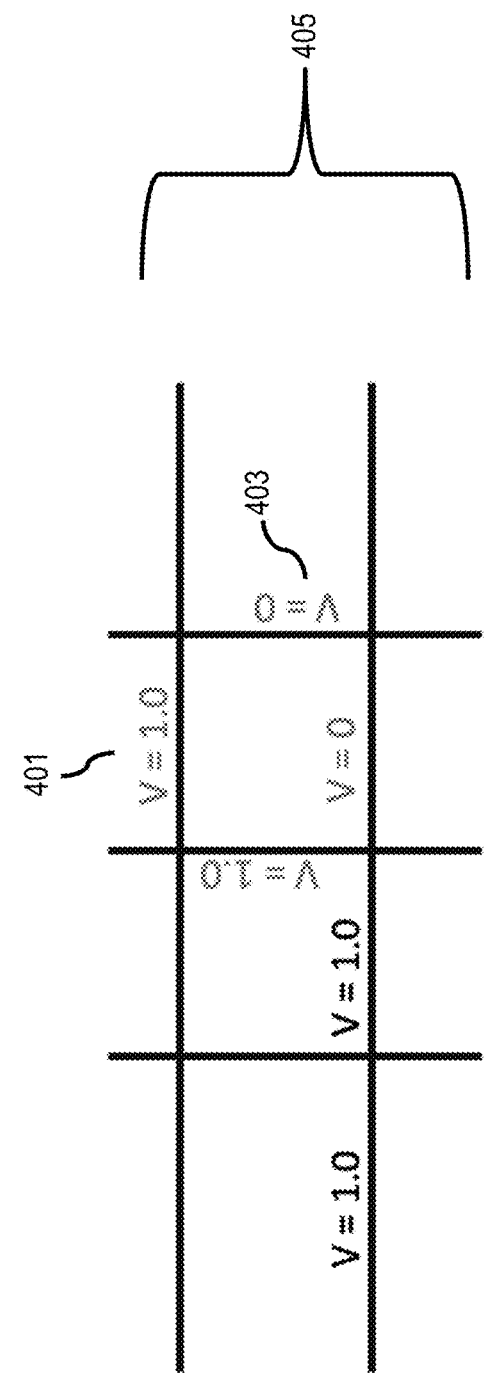
Figure 4C:
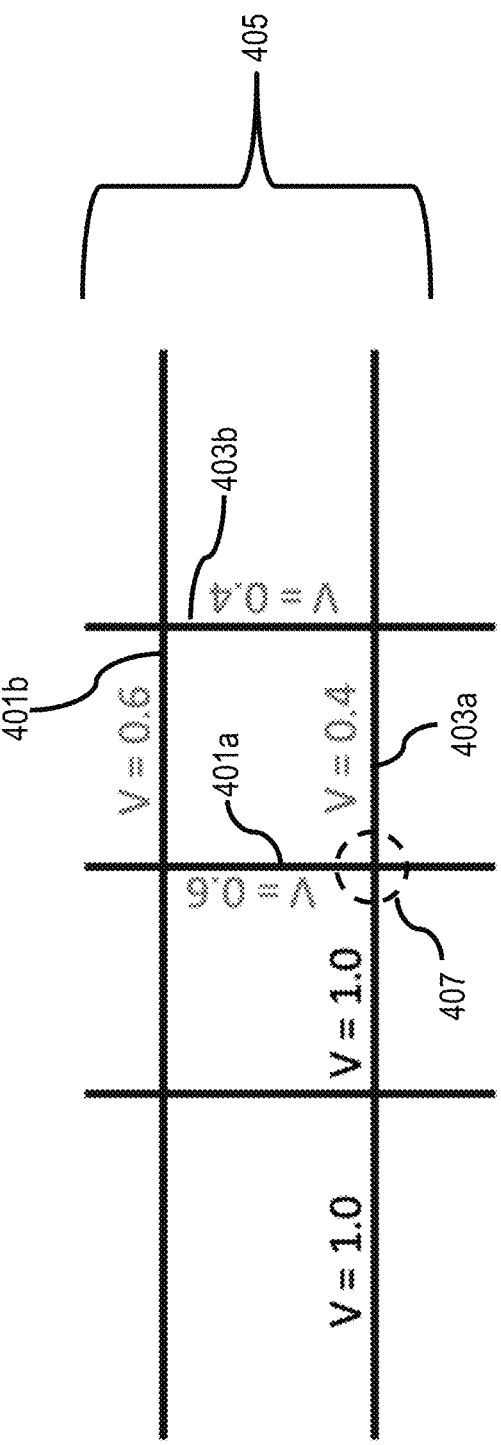

In contrast, in one embodiment, the system 100 uses what may be termed a "soft path selection" to keep multiple paths and use their probabilities as weights. This is illustrated in FIGS. 4A-4C. Referring to FIG. 4A, the system 100 (e.g., using a pathing algorithm) determines two potential paths 401 and 403 along the road network 405 between probe points 407$a$ and 407$d$, each path with a different probability and/or vehicle count. For example, the system 100 can determine that path 401 has a probability of 0.6 and path 403 has a probability of 0.4. In other words, over a given time, 6 vehicles traveled between points 407$a$ and 407$d$ using path 401 and 4 vehicles traveled between the points 407$a$ and 407$d$ using path 403.

In this example, if the system 100 used a traditional hard path selection, then the path with the highest probability (401) would be picked, and the other path (403) would be discarded. In other words, using the hard path selection approach, the system 100 would set the probability of the path 401 to 1.0, and the probability of path 403 to 0.0, as depicted in FIG. 4B. By doing this adjustment, the system 100 would discard important information; the high likelihood of the path 403 (e.g., only 2 less vehicles than path 401). In other words, the system 100 treats the following two cases the same (p1=0.999999, p2=0.000001 and p1=0.500001, p2=0.49999), which reduces the accuracy of the inferred traffic conditions on path 403.

In one embodiment, the system 100 instead keeps both paths 401 and 403 and assigns the road segments on these paths the probabilities of those paths as weights instead of picking one path at the cost of discarding potentially useful paths and/or information, as depicted in FIG. 4C. In this example, at the bottom left corner of the road network 405 (highlighted by the circle 407), paths 401 and 403 overlap. Therefore, the feature value is 0.6+0.4=1.0 vehicles for both road segments 401$a$ and 403$a$. Then, the two paths split. Path 401 goes up (401$a$) and right (401$b$), whereas path 403 continues straight (403$a$) and then goes up (403$b$). In one embodiment, the system 100 assigns each of the two road segments on the path 401 after the overlap 407 (e.g., 401$a$ and 401$b$) a feature value of 0.6 vehicles and assigns each of the two road segments on the path 403 after the overlap 407 (e.g., 403$a$ and 403$b$) a feature value of 0.4 vehicles. In one instance, the system 100 repeats this approach over all vehicles 103 monitored in the road segment 405. In one embodiment, the system 100 sums the resulting weighted paths over all vehicles' paths and the aggregate result is assigned as a volume feature value to each road segment. As a result, information from paths with a relatively high probability but not the highest probability (e.g., path 403) are still included in the system 100's final decision-making process. Thus, in contrast to the hard path selection approach, the system 100 can verify that path 403 remains open despite less traffic relative to path 401.

In one embodiment, the system 100 includes only paths whose probability/weight is above a certain threshold and any path less than that threshold would be discarded. As a result, the system 100 cleans relatively low probability paths while keeping those which have a chance to be the true path. For instance, the system 100 could set the threshold based on a minimum acceptable probability, which should be satisfied by a given path. In this case, the rule would be:

If p_i>p_thresh:
then include the path i
else:
exclude the path i

In one embodiment, the system 100 could alternatively set the threshold based on how many times the maximum probability can be greater than the probability of a path. For this case, the rule is:

If p_max/p_i<thresh:
then include path i
else:
exclude path i

In another embodiment, the system 100 could keep the K highest probabilities and drop the rest. In one instance, the system 100 could even combine a few of these rules to decide which paths to keep and which to drop. In the event of path removal, the system 100 can maintain the probabilities/weights of the surviving paths or the system 100 can normalize the values so that they add up to 1. Thereafter, in one instance, the features generated for each road segment would use these normalized, final probabilities/weights. Consequently, the system 100's integration of soft paths (i.e., highly probable paths) into feature calculation improves its automatic closure verification (ACV) decision accuracy.

Figure 5:
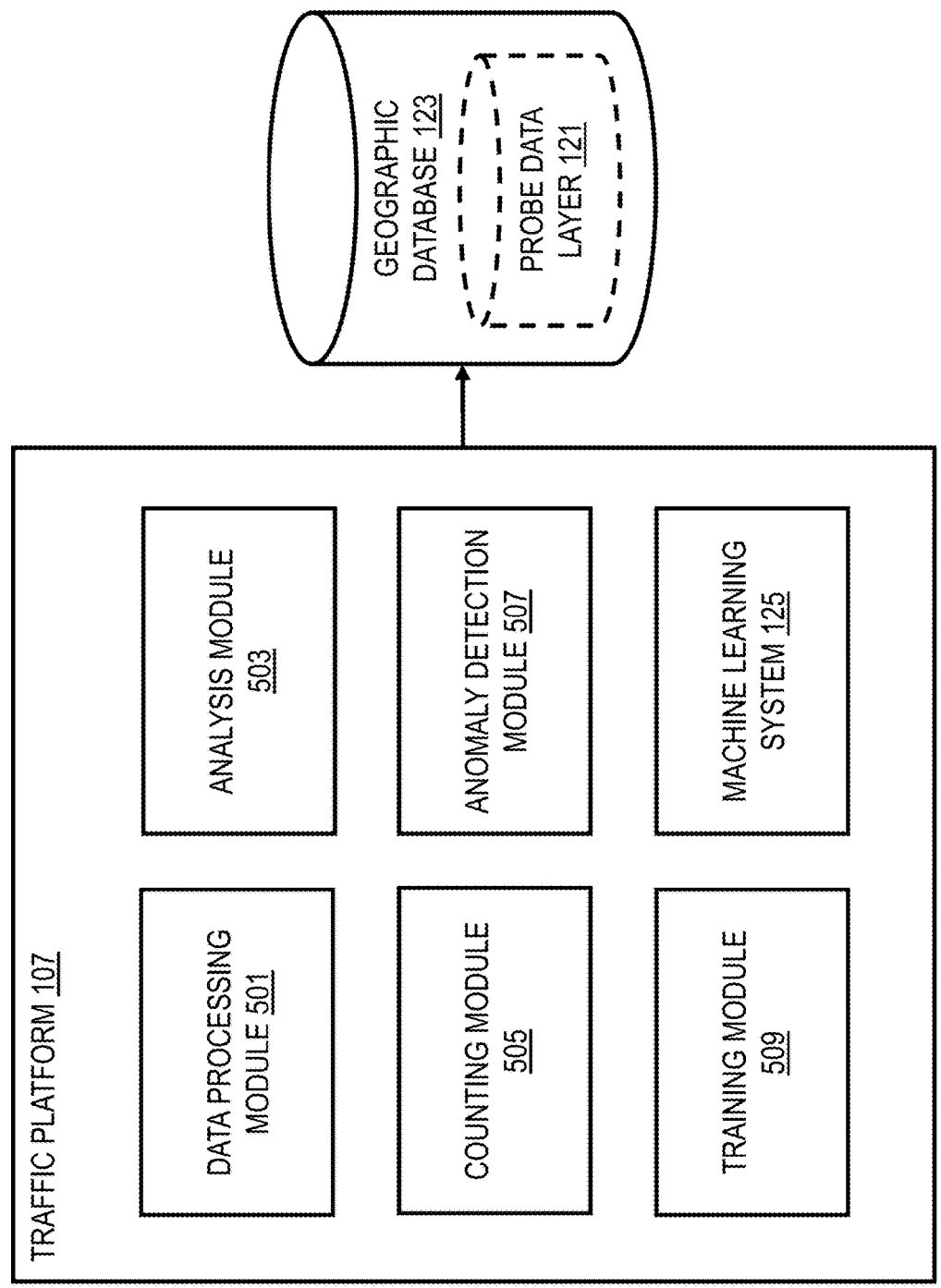
FIG. 5 is a diagram of the components of a traffic platform configured to automatically verify a road closure using multiple possible vehicle paths, according to one embodiment.

FIG. 5 is a diagram of the components of the traffic platform 107, according to one embodiment. By way of example, the traffic platform 107 includes one or more components for automatically verifying a road closure using multiple possible vehicle paths, according to the various embodiments described herein. It is contemplated that the functions of these components may be combined or performed by other components of equivalent functionality. In one embodiment, the traffic platform 107 includes an data processing module 501, an analysis module 503, a counting module 505, an anomaly detection module 507, a training module 509, and the machine learning system 125, and has connectivity to the geographic database 123 including the probe data layer 121. The above presented modules and components of the traffic platform 107 can be implemented in hardware, firmware, software, or a combination thereof. Though depicted as a separate entity in FIG. 1, it is contemplated that the traffic platform 107 may be implemented as a module of any other component of the system 100. In another embodiment, the traffic platform 107 and/or the modules 501-509 may be implemented as a cloud-based service, local service, native application, or combination thereof. The functions of the traffic platform 107, the machine learning system 125, and/or the modules 501-509 are discussed with respect to FIG. 6.

Figure 6:
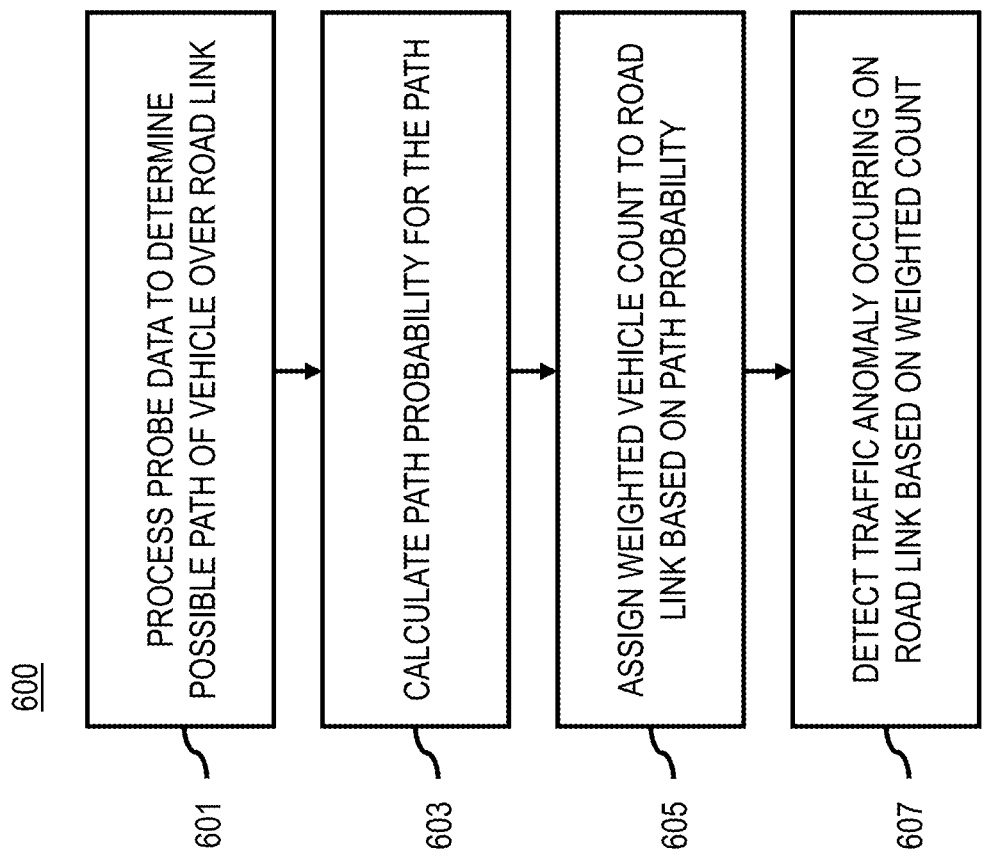
FIG. 6 is a flowchart of a process for automatically verifying a road closure using multiple possible vehicle paths, according to one embodiment.
Figure 10:
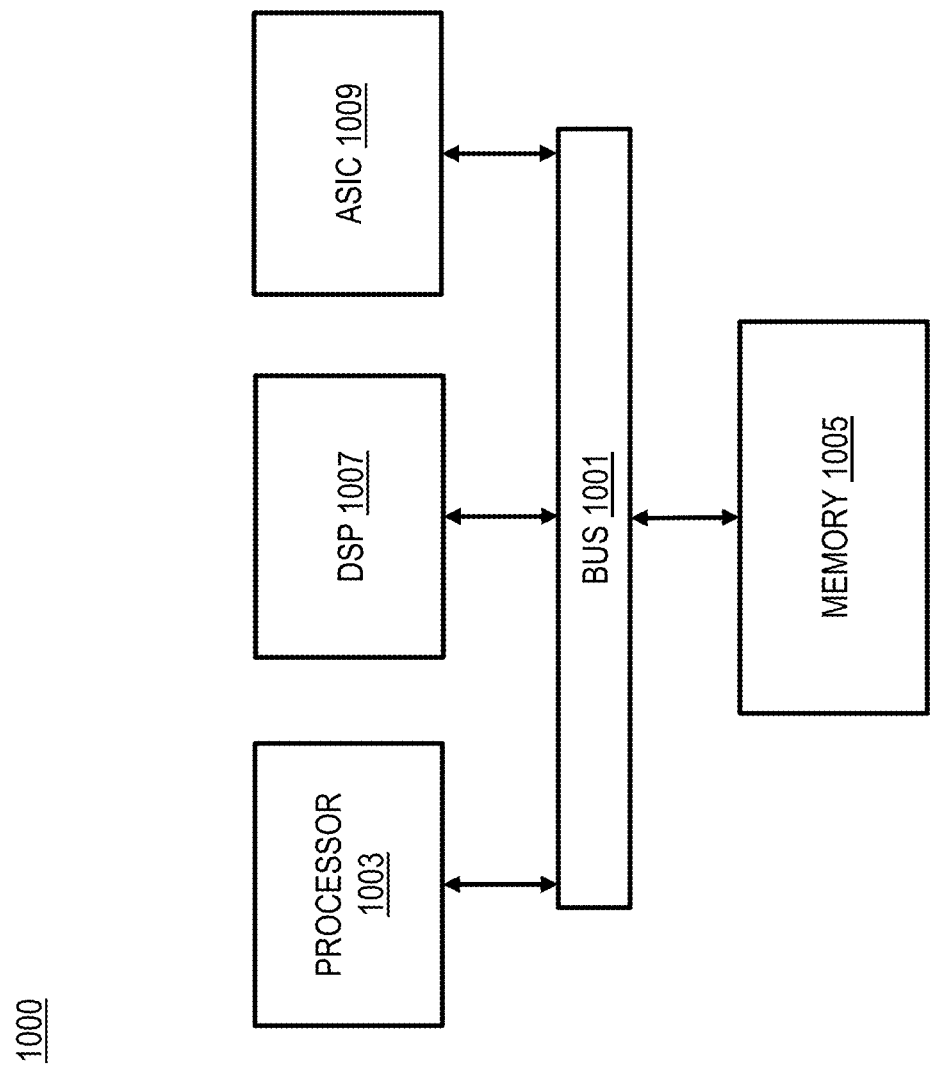
FIG. 10 is a diagram of a chip set that can be used to implement an embodiment.

FIG. 6 is a flowchart of a process for automatically verifying a road closure using multiple possible vehicle paths, according to one embodiment. In various embodiments, the traffic platform 107, the machine learning system 125, and/or any of the modules 501-509 may perform one or more portions of the process 600 and may be implemented in, for instance, a chip set including a processor and a memory as shown in FIG. 10. As such, the traffic platform 107, the machine learning system 125, and/or the modules 501-509 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all the illustrated steps.

In step 601, the data processing module 501 processes probe data to determine at least one possible path of a vehicle over a road graph, wherein the road graph (e.g., a closure link graph and/or superlink graph) represents a road link and one or more other road links entering or exiting the road link. In one embodiment, each vehicle 103 (e.g., a standard vehicle, an autonomous vehicle, a HAD vehicle, a semi-autonomous vehicle, etc.) can be configured to report probe data via a vehicle sensor 105, a UE 111, or a combination thereof as probe points, which are individual data records collected at a point in time that records telemetry data for the vehicle 103 for that point in time. By way of example, a vehicle sensor 105 may include a RADAR system, a LiDAR system, a global positioning sensor for gathering probe data (e.g., GPS probe data). In one embodiment, a probe point may include the following five attributes (by way of illustration and not limitation): (1) probe ID; (2) longitude; (3) latitude; (4) speed; and (5) time. In one embodiment, the data processing module 501 can split the plurality of probe points per vehicle 103 based on the unique probe IDs to represent the travel trajectory or vehicle path (e.g., speed and heading) of each vehicle 103. In one instance, the probe data processed by the data processing module 501 from the vehicle sensors 105, the UEs 111, or a combination thereof may be stored in or accessed via the probe data layer 121, the geographic database 123, or a combination thereof. In one embodiment, the at least one possible path includes a plurality of possible paths. For example, the at least one possible path may include paths 401 and 403, as depicted in FIG. 4A.

In one embodiment, the data processing module 501 determines at least one possible path of a vehicle 103 by converting the probe points to vehicle paths based on a time difference threshold. For example, for a specific vehicle 103, the data processing module 501 can take the first and second probes received, denoted as probe1 and probe2. If the analysis module 503 determines that the time difference between these probes is more than a specified threshold, then the data processing module 501 will discard the probe1, set probe1=probe2, and repeat the process. Otherwise, the data processing module 501 will build a path from probe1 to probe2 (e.g., using any pathing algorithm such as A* or equivalent). Thereafter, the data processing module 501 records the new path for the vehicle 103, discards probe1, set probe1=probe2 and repeats the process.

In step 603, the analysis module 503 calculates a path probability for the at least one possible path, wherein the path probability indicates a likelihood that the at least one possible path is a true path of the vehicle over the road graph. In one embodiment, the analysis module 503 calculates the path probability or weight based on one or more vehicle path related features. For example, the analysis module 503 can calculate the path probability based on a comparison of the actual or observed volume of vehicle 103 paths for the at least one possible path determined by the data processing module 501 against the expected values for the path. In one instance, the expected values may be stored in or accessed via the probe data layer 121, the geographic database 123, or a combination thereof.

In one embodiment, the analysis module 503 discards a path from the at least one possible path based on determining that the path probability does not meet a probability criterion. In one instance, the probability criterion includes a minimum probability threshold. By way of example, that analysis module 503 may discard a path that has a very low probability but will keep those paths that have at least some chance of being the true path. For example, if the analysis module 503 calculates a path probability of 0.6 for a first path and a path probability of 0.4 for a second path, the analysis module 503 will keep the second path, rather than discarding it, as there is a high likelihood that this path may be the true path. In one embodiment, the probability criterion is based on how many times a maximum probability can be greater than the path probability. In one instance, the probability criterion includes keeping a designated number of the plurality paths and discarding any paths more than then the designated number, wherein the keeping of the designated number of the plurality of paths, the discarding of any of the paths, or a combination thereof is based on a magnitude of path probability values for the plurality of paths (e.g., k highest probabilities). In one embodiment, the analysis module 503 could also combine one or more probability criterion to decide which paths to keep and which to discard.

In step 605, the counting module 505 assigns a weighted vehicle count to the road link, the one or more other road links, or a combination thereof contained in the at least one possible path, wherein the weighted vehicle count is based on the path probability. By way of example, the counting module 505 would assign a weighted vehicle count 0.6 to road links 401*a* and 401*b* based on the determined probability of 0.6 for path 401 and a weighted vehicle count 0.4 to road links 403*a* and 403*b* based on the determined probability of 0.4 for path 403, as described with respect to FIG. 4C. In one embodiment, the analysis module 503 normalizes the weighted vehicle count after the discarding of the path from the at least one possible path so that the counts of the remaining road links add to 1. Alternatively, in one instance, the analysis module 503 can maintain the weighted vehicle count as unchanged after the discarding of the path from the at least one possible path (e.g., to minimize processing complexity).

In step 607, the anomaly detection module 507 detects a traffic anomaly occurring on the road link based on the weighted vehicle count. By way of example the traffic anomaly may be any abnormalities in traffic that can affect traffic flow such as accidents, lane closures, road closures, etc. In one instance, the anomaly detection module 507 can detect the traffic anomaly based on a comparison of the weighted vehicle count versus the historical expected vehicle volume. In one embodiment, the historical expected vehicle volume may be stored in and/or accessed by the anomaly detection module 507 via the probe data layer 121 and/or the geographic database 123. By way of example, the historical expected vehicle volume data may comprise individual statistics such as unique historical vehicles 103 for each road segment in each of the time epochs, summary statistics (e.g., mean, median, etc.), or a combination thereof. In one instance, the historical expected vehicle volumes may include contextual and/or temporal data such as the day of the week, the time of day, the weather, the road conditions, etc.

In one embodiment, the machine learning system 125 verifies a road closure on the road link based on the detected traffic anomaly. In one instance, the training module 509 can train or condition the machine learning system 125 using a set of vehicle path related features or inputs (e.g., stored in and/or accessible via the probe data layer 121 and/or the geographic database 123) that indicate a vehicle volume on various paths within the road graph. By way of example, the generated features may include, but are not limited to, the number of real-time actual observed vehicle paths passing through a road segment as well as the expected or historic volume of vehicle paths on the road segment. In one embodiment, once the analysis module 503 determines that the calculated path probability meets the probability criterion, the counting module 505 calculates the weighted vehicle count or features for that road link for training and use with the machine learning system 125. In one instance, the training module 509 can train the machine learning system 125 to verify road closures on the road link by assigning weights, correlations, relationships, etc. among the features corresponding to actual and expected vehicle volumes on a road segment. In one embodiment, the training module 509 can continuously provide and/or update a machine learning module (e.g., a support vector machine (SVM), neural network, decision tree, etc.) of the machine learning system 125 during training using, for instance, supervised deep convolution networks or equivalents. In other words, the training module 509 trains a machine learning model using the various vehicle path related features to enable the machine learning system 125 to automatically verify a road closure on the road link using multiple potential vehicle paths (i.e., soft vehicle path selection).

In one embodiment, the data processing module 501 monitors other probe data from at least one other vehicle traveling over the road graph (e.g., one or more other vehicles 103). In one instance, the machine learning system 125 in combination with the analysis module 503, the counting module 505, and the anomaly detection module 507 iterates the calculating of the path probability and the assigning of the weighted vehicle count over the other probe data, wherein the traffic anomaly is detected further based on the iterating over the other probe data. For example, this approach may be repeated over all vehicles 103 monitored in the road network. The resulting weighted paths can then be summed by the analysis module 503 over all vehicles' paths and the aggregate result may be assigned by the counting module 505 as a volume feature value to each road segment. In this way the information coming from the paths with not the highest probability but still with a high probability is included by the machine learning system 125.

Figure 7A:
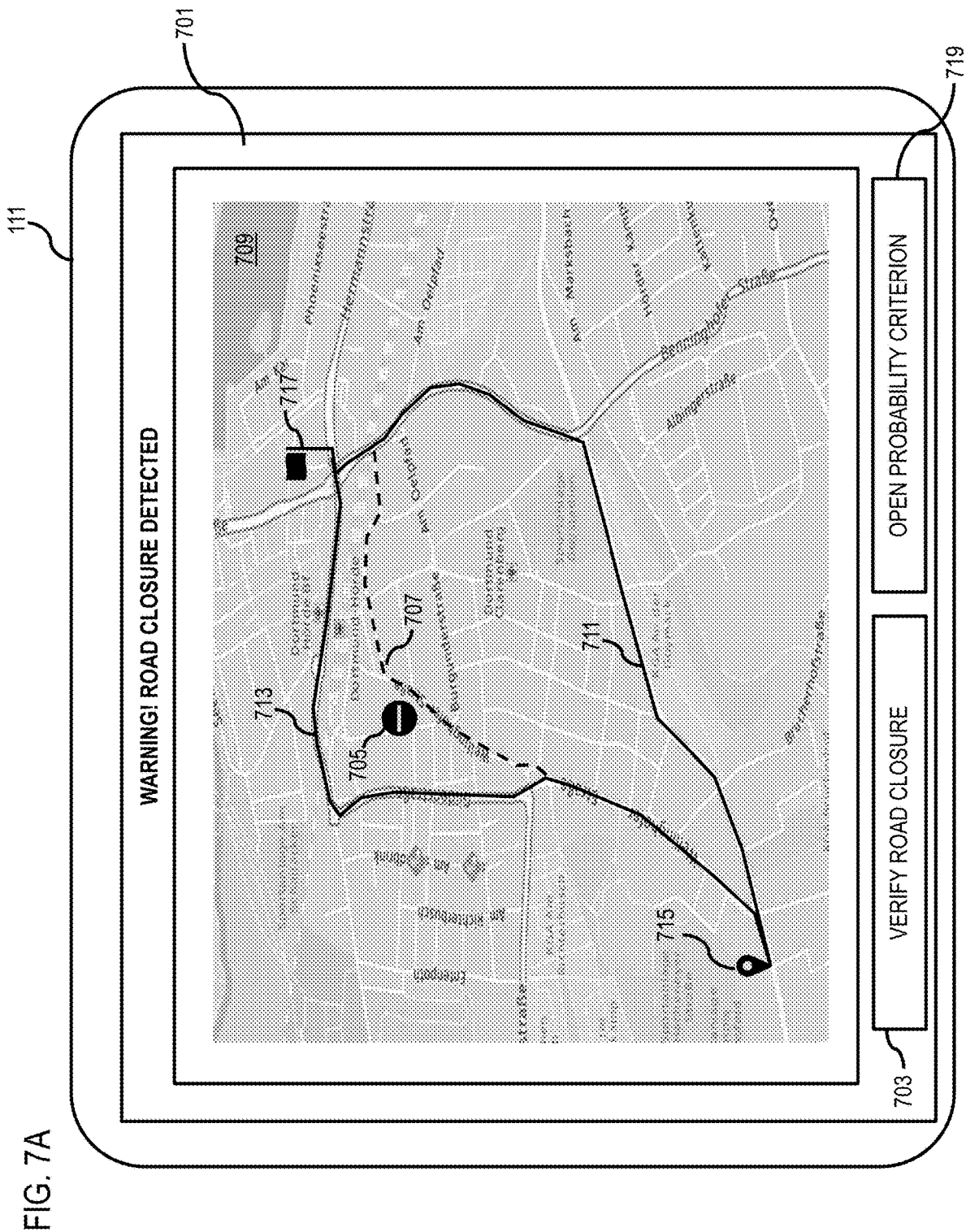
FIGS. 7A and 7B are diagrams of example user interfaces capable of automatically verifying a road closure using multiple possible vehicle paths, according to one embodiment.
Figure 7B:
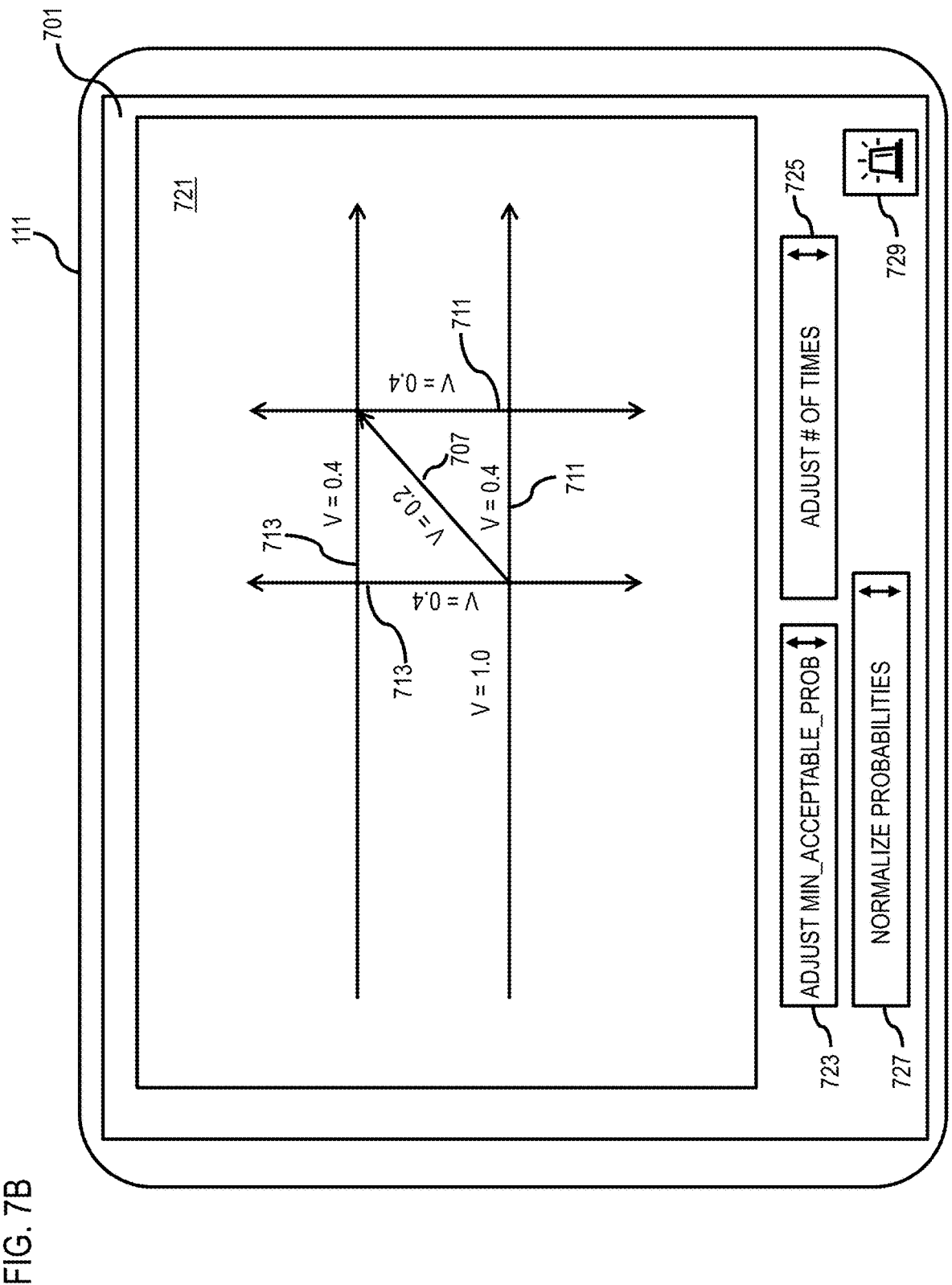

FIGS. 7A and 7B are diagrams of example user interfaces capable of automatically verifying a road closure using multiple possible vehicle paths, according to one embodiment. In this example, a user interface (UI) 701 (e.g., a navigation application 113) is generated for a UE 111 (e.g., a mobile device, an embedded navigation system, a client terminal, etc.) that includes an input 703 that enables a user (e.g., a software developer) to verify a road closure 705 (e.g., "Warning! Road Closure Detected") on a road segment of interest 707 based on a reported road closure within a monitored area 709.

In this example, the system 100 has generated vehicle paths 707, 711, and 713 between a first probe point 715 (e.g., a starting point) and a second probe point 717 (e.g., a destination) based on the GPS probes received from a vehicle 103 traveling on the road segments. In one embodiment, the system 100 has determined that the path 707 is currently closed and/or severely congested and that the paths 711 and 713 are open. However, as described above, the system 100 may have erroneously discounted path 707 as a possible path. Thus, the user may want to verify the system 100's determination before the system 100 outputs a systemwide update to a navigation application 113. For example, but for the road closure 705, a vehicle 103 could reach the destination 717 much faster by traveling on route 707 compared to routes 711 or 713 (at least in terms of approximate distance of travel).

In one embodiment, the system 100 can generate the UI 701 such that it includes an input 719 that enables a user (e.g., a software engineer) to transition (or toggle) between the monitored area 709 and a visual dashboard 721 (e.g., volume feature values after soft path selection), as depicted in FIG. 7B. In one instance, the system 100 can generate the UI 701 such that it includes: (1) an input 723 to enable a user to adjust the minimum acceptable probability which should be satisfied by a given path to be kept by the system 100 as a possible true path; (2) an input 725 to enable a user to adjust the number of times the maximum probability can be greater than the probability of a path; and (3) an input 727 to enable the user in the case of path removal to normalize the probabilities/weights of the surviving paths so that they add up to 1. It is contemplated that by viewing the different inferences reached by the system 100 through manipulations of the various thresholds and probability criterion, a user can have a better understanding of the traits and features of the verification process and the system 100 and/or machine learning system 125 can derive better metrics for automatically verifying road closures and/or scoring such verifications against some sort of ground truth (e.g., a human verified closure).

In one instance, the system 100 can generate the UI 701 such that it includes an input 729 to enable a user (e.g., a software developer) to flag a road or path (e.g., path 707) for further evaluation and/or verification (e.g., manual confirmation). For example, in this instance, the system 100 can determine a feature value of 0.2 vehicles for path 707, a feature value of 0.4 vehicles for path 711, and a feature value of 0.4 vehicles for path 713. As described above, if the system 100 used a hard path selection rather than the soft path selection proposed herein, then the paths with the highest probabilities 711 and 713 would be picked as the true path and the path 707 would be discarded (i.e., represented as closed). However, the probability/weight of the path 707 may in fact be above a certain threshold (e.g., a minimum acceptable probability) and/or within a threshold of the probability/weights of the other possible paths and, therefore, should not be prematurely discarded.

In one embodiment, a user can interact with the inputs 703, 719, 723, 725, 727, and 729 via one or more physical interactions (e.g., a touch, a tap, a gesture, typing, etc.), one or more voice commands (e.g., "verify road closure," "increase minimum acceptable probability," "flag road closure," etc.), or a combination thereof. By way of example, a user may also be a driver or a passenger of a vehicle 103 (e.g., an autonomous or semi-autonomous vehicle) and she or he may want to confirm that the routing or guidance determined by the system 100 including road closures is accurate and/or up-to-date to feel more comfortable about her or his journey. This is particularly true in the case of a user that is a passenger in an autonomous vehicle 103. It is contemplated that in this instance, the system 100 can determine or detect one or more actions by a user (e.g., a rapid increase in heart rate, rapid eye movement, etc.) and, therefore, automatically initiate the verification of the road closure process ahead of time in an attempt to comfort the user in response to the one or more detected user actions.

Returning to FIG. 1, in one embodiment, the traffic platform 107 performs the process for automatically verifying a road closure using multiple possible vehicle paths as discussed with respect to the various embodiments described herein. For example, the traffic platform 107 can generate vehicle path related features for machine learning solutions (e.g., ACV).

In one embodiment, the machine learning system 125 of the traffic platform 107 includes a neural network or other machine learning system to compare (e.g., iteratively) vehicle paths features and/or enhanced vehicle path features (e.g., using soft vehicle paths) to expected values for these features on reported road segments. For example, when the inputs are features/flags indicating a reduction of vehicle volume and/or vehicle path data in a monitored area, the output can include an evaluation as to whether a road segment in the monitored area is closed or not. In one embodiment, the neural network of the machine learning system 125 is a traditional convolutional neural network which consists of multiple layers of collections of one or more neurons (which are configured to process a portion of an input data). In one embodiment, the machine learning system 125 also has connectivity or access over the communication network 109 to the probe data layer 121 and/or the geographic database 123 that can each store probe data, labeled or marked features (e.g., historically expected volumes and/or real-time actual observed volumes on road segments), etc.

In one embodiment, the traffic platform 107 has connectivity over the communications network 109 to the services platform 115 (e.g., an OEM platform) that provides the services 117a-117n (also collectively referred to herein as services 117) (e.g., probe and/or sensor data collection services). By way of example, the services 117 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 115 uses the output (e.g. whether a road segment is closed or not) of the traffic platform 107 to provide services such as navigation, mapping, other location-based services, etc.

In one embodiment, the traffic platform 107 may be a platform with multiple interconnected components. The traffic platform 107 may include multiple servers, intelligent networking devices, computing devices, components and corresponding software for providing parametric representations of lane lines. In addition, it is noted that the traffic platform 107 may be a separate entity of the system 100, a part of the services platform 115, a part of the one or more services 117, or included within a vehicle 103 (e.g., an embedded navigation system).

In one embodiment, content providers 119 may provide content or data (e.g., including road closure reports, probe data, expected vehicle volume data, etc.) to the traffic platform 107, the UEs 111, the applications 113, the services platform 115, the services 117, the probe data layer 121, the geographic database 123, and the vehicles 103. The content provided may be any type of content, such as map content, textual content, audio content, video content, image content, etc. In one embodiment, the content providers 119 may provide content regarding the expected frequency of vehicles 103 on the digital map or link as well as content that may aid in localizing a vehicle path or trajectory on a digital map or link (e.g., to assist with determining actual vehicle volumes on a road network). In one embodiment, the content providers 119 may also store content associated with the traffic platform 107, the services platform 115, the services 117, the probe data layer 121, the geographic database 123, and/or the vehicles 103. In another embodiment, the content providers 119 may manage access to a central repository of data, and offer a consistent, standard interface to data, such as a repository of the probe data layer 121 and/or the geographic database 123.

By way of example, the UEs 111 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 111 can support any type of interface to the user (such as "wearable" circuitry, etc.). In one embodiment, a UE 111 may be associated with a vehicle 103 (e.g., a mobile device) or be a component part of the vehicle 103 (e.g., an embedded navigation system). In one embodiment, the UEs 111 may include the traffic platform 107 to automatically verify a road closure using multiple possible vehicle paths.

In one embodiment, as mentioned above, the vehicles 103, for instance, are part of a probe-based system for collecting probe data for detecting actual and expected vehicle volumes on a road network and/or measuring traffic conditions in a road network (e.g., free flow traffic versus a road closure). In one embodiment, each vehicle 103 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 103 may include vehicle sensors 105 for reporting measuring and/or reporting attributes. The attributes can also be any attribute normally collected by an on-board diagnostic (OBD) system of the vehicle 103, and available through an interface to the OBD system (e.g., OBD II interface or other similar interface).

The probe points can be reported from the vehicles 103 in real-time, in batches, continuously, or at any other frequency requested by the system 100 over, for instance, the communication network 109 for processing by the traffic platform 107. The probe points also can be map matched to specific road links stored in the geographic database 123. In one embodiment, the system 100 (e.g., via the traffic platform 107) generates vehicle paths or trajectories from the observed and expected frequency of probe points for an individual probe as discussed with respect to the various embodiments described herein so that the probe traces represent a travel trajectory or vehicle path of the probe through the road network.

In one embodiment, as previously stated, the vehicles 103 are configured with various sensors (e.g., vehicle sensors 105) for generating or collecting probe data, sensor data, related geographic/map data, etc. In one embodiment, the sensed data represents sensor data associated with a geographic location or coordinates at which the sensor data was collected (e.g., a latitude and longitude pair). In one embodiment, the probe data (e.g., stored in the probe data layer 121) includes location probes collected by one or more vehicle sensors 105. By way of example, the vehicle sensors 105 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 103, switch sensors for determining whether one or more vehicle switches are engaged, and the like. Though depicted as automobiles, it is contemplated that vehicles 103 can be any type of vehicle manned or unmanned (e.g., cars, trucks, buses, vans, motorcycles, scooters, drones, etc.) that travels through road segments of a road network.

Other examples of sensors 105 of a vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of a vehicle 103 along a path of travel, moisture sensors, pressure sensors, etc. In a further example embodiment, vehicle sensors 105 about the perimeter of a vehicle 103 may detect the relative distance of the vehicle 103 from a physical divider, a lane line of a link or roadway, the presence of other vehicles, pedestrians, traffic lights, potholes and any other objects, or a combination thereof. In one scenario, the vehicle sensors 105 may detect weather data, traffic information, or a combination thereof. In one embodiment, a vehicle 103 may include GPS or other satellite-based receivers 105 to obtain geographic coordinates from satellites 127 for determining current location and time. Further, the location can be determined by visual odometry, triangulation systems such as A-GPS, Cell of Origin, or other location extrapolation technologies.

In one embodiment, the UEs 111 may also be configured with various sensors (not shown for illustrative convenience) for acquiring and/or generating probe data and/or sensor data associated with a vehicle 103, a driver, a passenger, other vehicles, conditions regarding the driving environment or roadway, etc. For example, such sensors may be used as GPS receivers for interacting with the one or more satellites 127 to determine and track the current speed, position and location of a vehicle 103 travelling along a link or road segment. In addition, the sensors may gather tilt data (e.g., a degree of incline or decline of the vehicle during travel), motion data, light data, sound data, image data, weather data, temporal data and other data associated with the vehicles 103 and/or UEs 111. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via the communication network 109 as probe data (e.g., GPS probe data) according to any known wireless communication protocols. For example, each UE 111, application 113, user, and/or vehicle 103 may be assigned a unique probe identifier (probe ID) for use in reporting or transmitting said probe data collected by the vehicles 103 and/or UEs 111. In one embodiment, each vehicle 103 and/or UE 111 is configured to report probe data as probe points, which are individual data records collected at a point in time that records telemetry data.

In one embodiment, the traffic platform 107 retrieves aggregated probe points gathered and/or generated by the vehicle sensors 105 and/or the UEs 111 resulting from the travel of the UEs 111 and/or vehicles 103 on a road segment of a road network. In one instance, the probe data layer 121 stores a plurality of probe points and/or trajectories generated by different vehicle sensors 105, UEs 111, applications 113, vehicles 103, etc. over a period while traveling in a large monitored area (e.g., a stretch of roadway where a closure incident is reported). A time sequence of probe points specifies a trajectory—i.e., a path traversed by a UE 111, application 113, vehicle 103, etc. over the period. In one instance, as the time between data points increases, so does the distance and the possible routes/paths between those two points.

In one embodiment, the communication network 109 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 103, vehicle sensors 105, traffic platform 107, UEs 111, applications 113, services platform 115, services 117, content providers 119, and/or satellites 127 communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
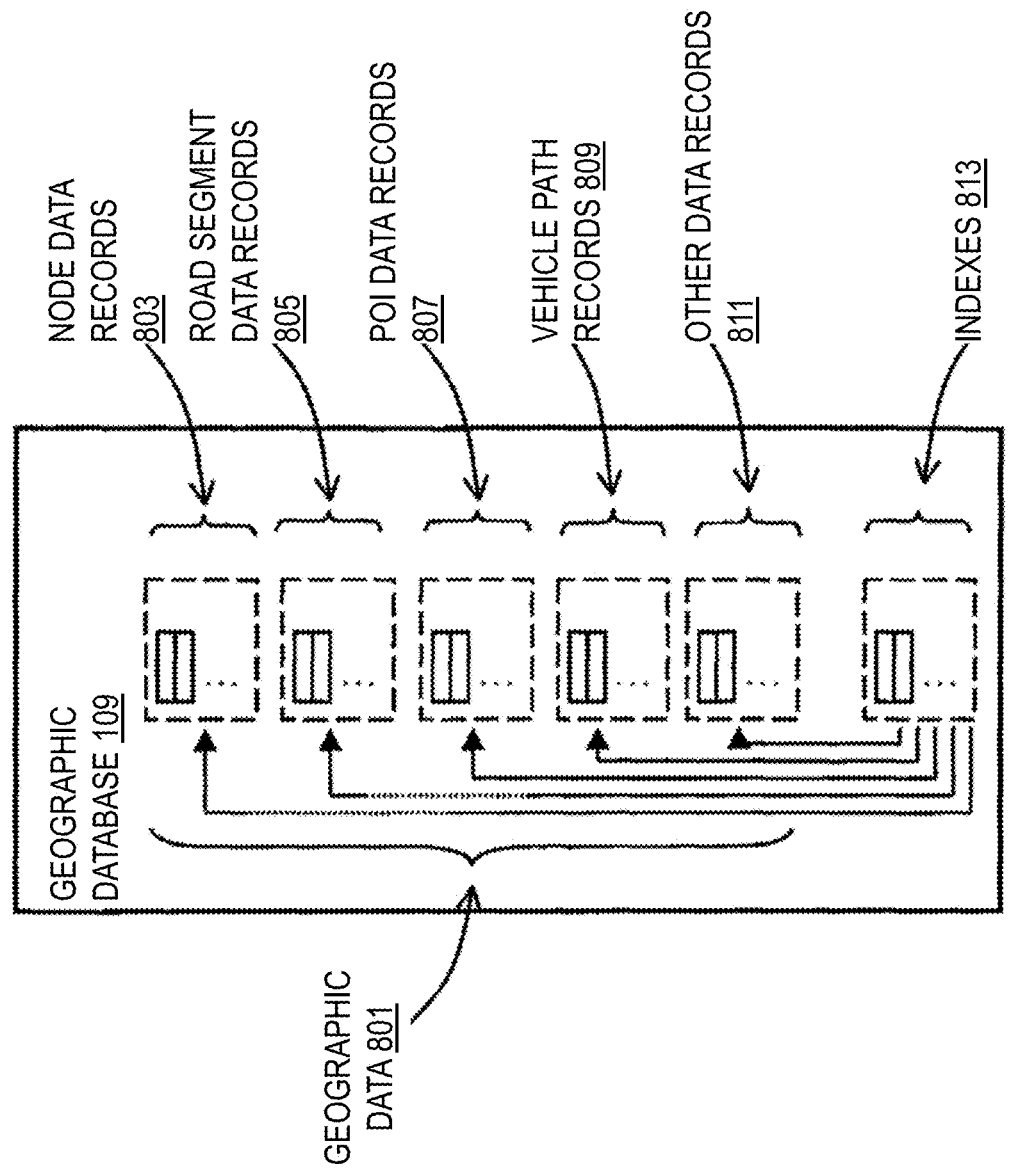
FIG. 8 is a diagram of a geographic database, according to one embodiment.

FIG. 8 is a diagram of a geographic database, according to one embodiment. In one embodiment, the geographic database 123 includes geographic data 801 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more-line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 803, road segment or link data records 805, Point of Interest (POI) data records 807, vehicle path records 809, other records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 123. In one embodiment, the indexes 813 may be used to quickly locate data without having to search every row in the geographic database 123 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 807. The geographic database 123 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 123 includes vehicle path records 809 for current and historical vehicle probe data, time window data, road closure detections, road closure reports, road closure evaluations, road closure link graphs, associated vehicle paths, vehicle path related features, enhanced vehicle path features, vehicle path probabilities/weights, sensor data, and/or any other related data. The vehicle path records 809 include a probe data layer 121 that stores the vehicle paths and volume feature values generated according to the various embodiments described herein. The probe data layer 121 can be provided to other system components or end users to provide related mapping, navigation, and/or other location-based services. In one embodiment, instead of picking one path at a cost of discarding potentially useful paths, the vehicle path records 809 (e.g., probabilities/weights) can be associated with segments of a road link (as opposed to an entire link). It is noted that the segmentation of the road for the purposes of verifying road closure can be different than the road link structure of the geographic database 123. In other words, the segments can further subdivide the links of the geographic database 123 into smaller segments (e.g., uniform lengths such as 5-meters) as well as aggregate the links and their probes into superlinks where it makes sense. In this way, road closures or other traffic incidents can be predicted and represented at a level of granularity that is independent of the granularity or at which the actual road or road network is represented in the geographic database 123. In one embodiment, the vehicle path records 809 can be associated with one or more of the node data records 803, road segment or link records 805, and/or POI data records 807; or portions thereof (e.g., smaller or different segments than indicated in the road segment records 805) to provide situational awareness to drivers and provide for safer autonomous operation of vehicles.

In one embodiment, the geographic database 123 can be maintained by the services platform 115 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., road closures or other traffic incidents, etc.) and/or record information about them, for example. Also, remote sensing, such as aerial or satellite photography, can be used.

In one embodiment, the geographic database 123 include high resolution or high definition (HD) mapping data that provide centimeter-level or better accuracy of map features. For example, the geographic database 123 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 123 is stored as a hierarchical or multilevel tile-based projection or structure. More specifically, in one embodiment, the geographic database 123 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103, a vehicle sensor 105 and/or a UE 111. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for automatically verifying a road closure using multiple possible vehicle paths may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
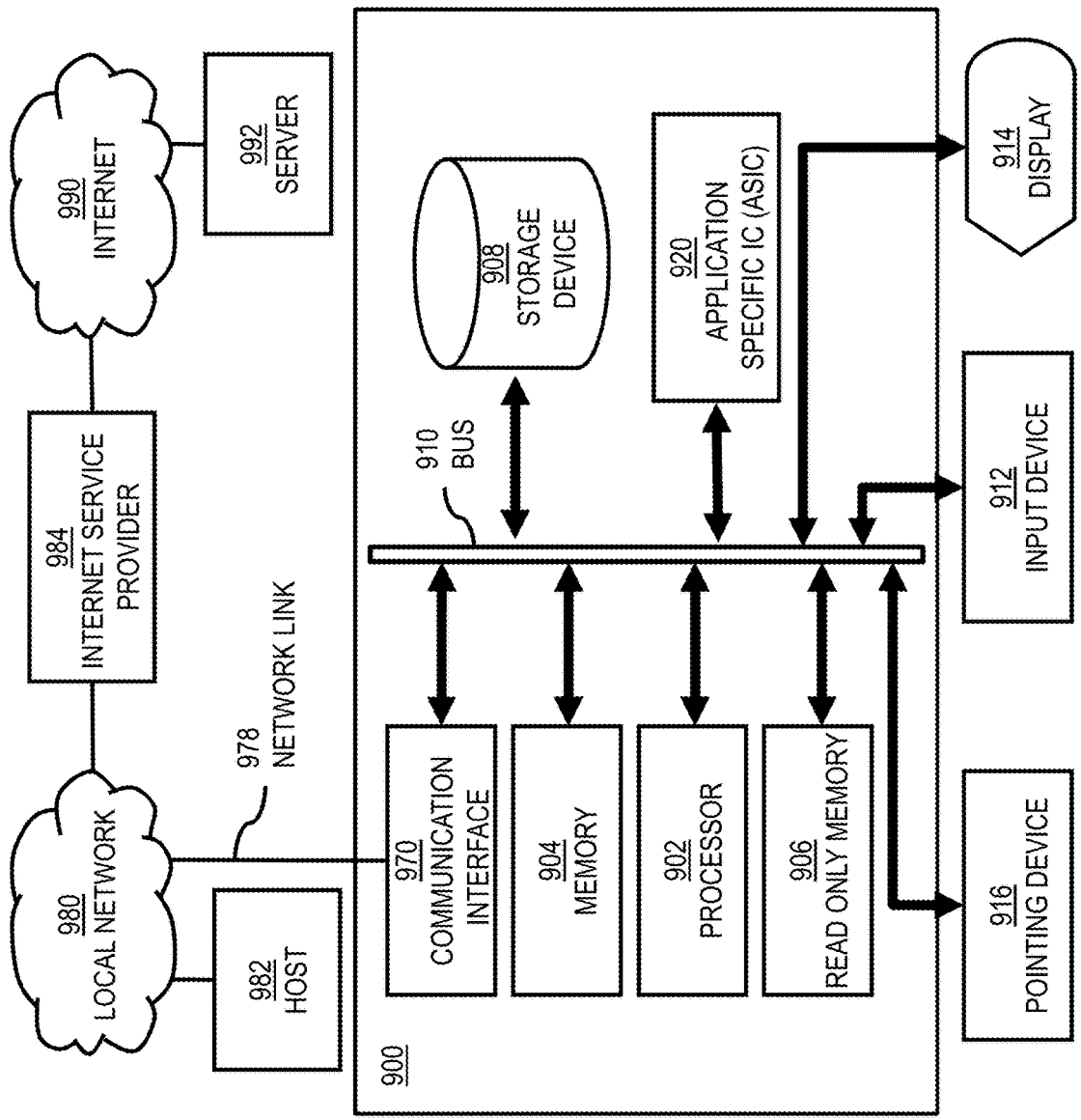
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to automatically verify a road closure using multiple possible vehicle paths as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to automatically verifying a road closure using multiple possible vehicle paths. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for automatically verifying a road closure using multiple possible vehicle paths. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for automatically verifying a road closure using multiple possible vehicle paths, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general, the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 109 for automatically verifying a road closure using multiple possible vehicle paths.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to automatically verify a road closure using multiple possible vehicle paths as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to automatically verify a road closure using multiple possible vehicle paths. The memory 1005 also stores the data associated with or generated by the execution of the inventive steps.

Figure 11:
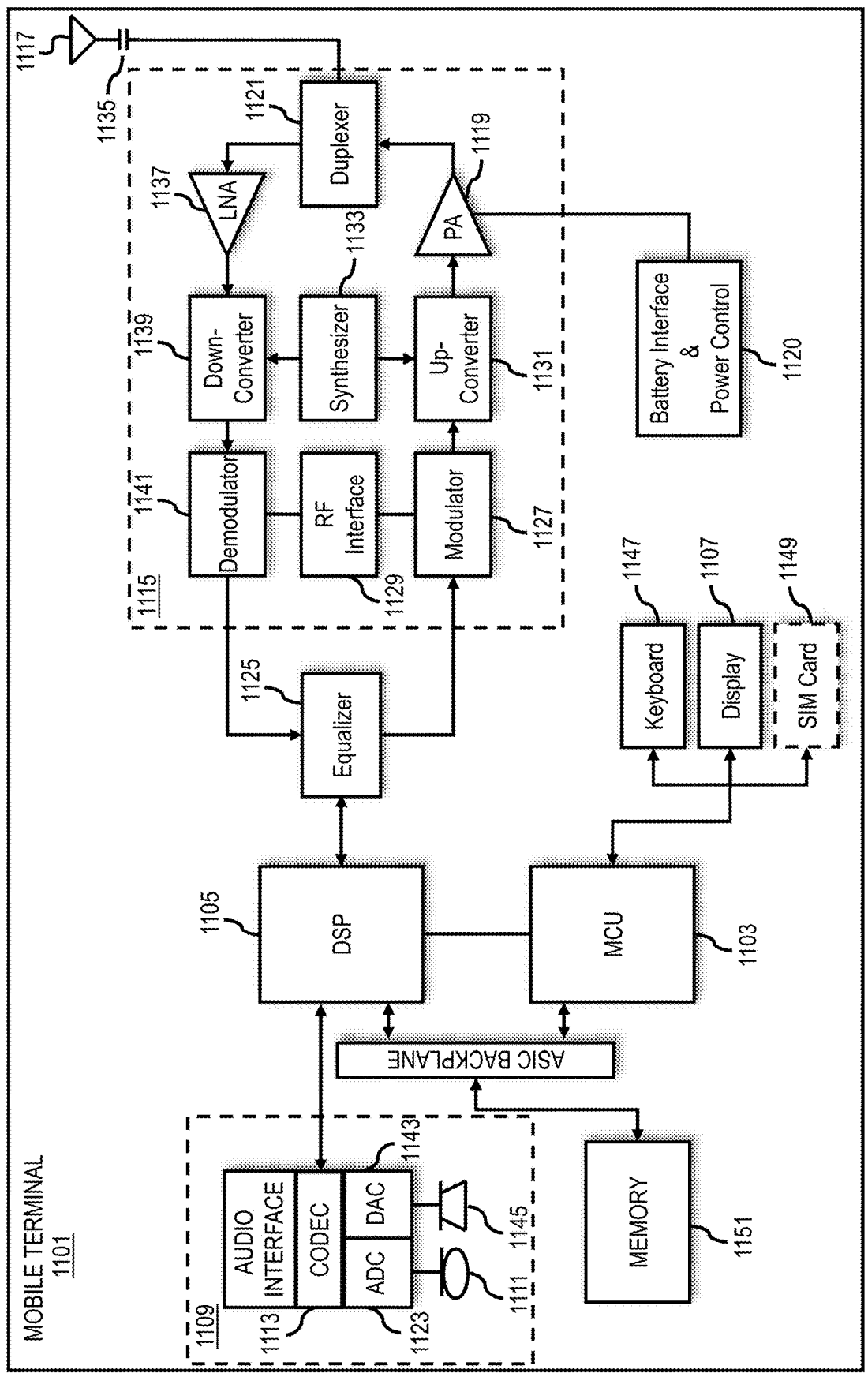
FIG. 11 is a diagram of a mobile terminal (e.g., handset or vehicle or part thereof) that can be used to implement an embodiment.

FIG. 11 is a diagram of exemplary components of a mobile terminal 1001 (e.g., a vehicle 103, a UE 111, or a component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to automatically verify a road closure using multiple possible vehicle paths. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing probe data to determine at least one possible path of a vehicle over a road graph, wherein the road graph represents a road link and one or more other road links entering or exiting the road link;
   calculating a path probability for the at least one possible path, wherein the path probability indicates a likelihood that the at least one possible path is a true path of the vehicle over the road graph;
   assigning a weighted vehicle count to the road link, the one or more other road links, or a combination thereof contained in the at least one possible path, wherein the weighted vehicle count is based on the path probability;
   detecting a traffic anomaly occurring on the road link based on the weighted vehicle count; and
   verifying a road closure on the road link based on the detected traffic anomaly.

2. The method of claim 1, further comprising:
   monitoring other probe data from at least one other vehicle traveling over the road graph; and
   iterating the calculating of the path probability and the assigning of the weighted vehicle count over the other probe data,
   wherein the traffic anomaly is detected further based on the iterating over the other probe data.

3. The method of claim 1, further comprising:
   discarding a path from the at least one possible path based on determining that the path probability for the path does not meet a probability criterion.

4. The method of claim 3, wherein the probability criterion includes a minimum probability threshold.

5. The method of claim 3, wherein the probability criterion is based on how many times a maximum probability can be greater than the path probability.

6. The method of claim 3, further comprising:
   normalizing the weighted vehicle count after the discarding of the path from the at least one possible path.

7. The method of claim 3, further comprising:
   maintaining the weighted vehicle count as unchanged after the discarding of the path from the at least one possible path.

8. The method of claim 3, wherein the at least one possible path includes a plurality of possible paths, and wherein the probability criterion includes keeping a designated number of the plurality paths and discarding any paths more than then the designated number.

9. The method of claim 8, wherein the keeping of the designated number of the plurality of paths, the discarding of the any paths, or a combination thereof is based on a magnitude of path probability values for the plurality of paths.

10. An apparatus comprising:
    at least one processor; and
    at least one memory including computer program code for one or more programs,
    the at least one memory and the computer program code configured to, with the at least one processor, cause the apparatus to perform at least the following,
    process probe data to determine at least one possible path of a vehicle over a road graph, wherein the road graph represents a road link and one or more other road links entering or exiting the road link;
    calculate a path probability for the at least one possible path, wherein the path probability indicates a likelihood that the at least one possible path is a true path of the vehicle over the road graph;
    assign a weighted vehicle count to the road link, the one or more other road links, or a combination thereof contained in the at least one possible path, wherein the weighted vehicle count is based on the path probability;
    detect a traffic anomaly occurring on the road link based on the weighted vehicle count; and
    verify a road closure on the road link based on the detected traffic anomaly.

11. The apparatus of claim 10, wherein the apparatus is further caused to:
    monitor other probe data from at least one other vehicle traveling over the road graph; and
    iterate the calculating of the path probability and the assigning of the weighted vehicle count over the other probe data,
    wherein the traffic anomaly is detected further based on the iterating over the other probe data.

12. The apparatus of claim 10, wherein the apparatus is further caused to:
    discard a path from the at least one possible path based on determining that the path probability for the path does not meet a probability criterion.

13. The apparatus of claim 12, wherein the probability criterion includes a minimum probability threshold.

14. The apparatus of claim 12, wherein the probability criterion is based on how many times a maximum probability can be greater than the path probability.

15. The apparatus of claim 12, wherein the apparatus is further caused to:
    normalize the weighted vehicle count after the discarding of the path from the at least one possible path.

16. The apparatus of claim 12, wherein the apparatus is further caused to:
    maintain the weighted vehicle count as unchanged after the discarding of the path from the at least one possible path.

17. A non-transitory computer-readable storage medium, carrying one or more sequences of one or more instructions which, when executed by one or more processors, cause an apparatus to at least perform the following steps:
    processing probe data to determine at least one possible path of a vehicle over a road graph, wherein the road graph represents a road link and one or more other road links entering or exiting the road link;
    calculating a path probability for the at least one possible path, wherein the path probability indicates a likelihood that the at least one possible path is a true path of the vehicle over the road graph;
    assigning a weighted vehicle count to the road link, the one or more other road links, or a combination thereof contained in the at least one possible path, wherein the weighted vehicle count is based on the path probability;
detect a traffic anomaly occurring on the road link based on the weighted vehicle count; and
verify a road closure on the road link based on the detected traffic anomaly.

18. The non-transitory computer-readable storage medium of claim 17, wherein the apparatus is further caused to perform:
monitoring other probe data from at least one other vehicle traveling over the road graph; and
iterating the calculating of the path probability and the assigning of the weighted vehicle count over the other probe data,
wherein the road closure is further verified based on the iterating over the other probe data.

* * * * *